(12) United States Patent
Dreher et al.

(10) Patent No.: US 12,491,835 B2
(45) Date of Patent: Dec. 9, 2025

(54) BELT RETRACTOR HAVING AN ELECTRIC MOTOR

(71) Applicant: AUTOLIV DEVELOPMENT AB, Vargarda (SE)

(72) Inventors: Eric Dreher, Elmshorn (DE); Andreas Lucht, Horst (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 113 days.

(21) Appl. No.: 18/564,418

(22) PCT Filed: May 19, 2022

(86) PCT No.: PCT/EP2022/063578
§ 371 (c)(1),
(2) Date: Nov. 27, 2023

(87) PCT Pub. No.: WO2022/248332
PCT Pub. Date: Dec. 1, 2022

(65) Prior Publication Data
US 2024/0246509 A1    Jul. 25, 2024

(30) Foreign Application Priority Data

May 27, 2021 (DE) ............... 10 2021 113 744.6

(51) Int. Cl.
*B60R 22/46* (2006.01)
*B60R 22/44* (2006.01)

(52) U.S. Cl.
CPC ...... *B60R 22/46* (2013.01); *B60R 2022/4473* (2013.01); *B60R 2022/4666* (2013.01)

(58) Field of Classification Search
CPC ............ B60R 22/46; B60R 2022/4473; B60R 2022/4666
See application file for complete search history.

(56) References Cited

U.S. PATENT DOCUMENTS 7,278,600 B2    10/2007  Inuzuka et al.
2002/0158162 A1*  10/2002  Fujii ................. B60R 22/44
                                                  280/806

(Continued)

FOREIGN PATENT DOCUMENTS

DE        19927731 A1   12/2000
DE        10101048 A1    7/2002

(Continued)

*Primary Examiner* — Timothy Hannon
(74) *Attorney, Agent, or Firm* — Dickinson Wright PLLC (57) ABSTRACT

A belt retractor having a belt shaft which is mounted rotatably on a frame fastenably fixed to a vehicle and on which belt shaft a seat belt can be wound, and having an electric motor for driving the belt shaft to perform a rotational movement, and having a shiftable planetary transmission which transmits the rotational movement from the electric motor to the belt shaft, having a planet carrier, and having a plurality of externally toothed planet gears which are mounted rotatably on the planet carrier and which, in order to produce a driving rotational connection, engage by means of their toothings in a toothing of a drive gear, which is driven by the electric motor, and, for the production of a driving rotational connection, said planet gears engage in a toothing of an output gear which is in driving rotational connection with the belt shaft.

20 Claims, 5 Drawing Sheets

(56) References Cited

U.S. PATENT DOCUMENTS

| | | | |
|---|---|---|---|
| 2003/0209900 A1* | 11/2003 | Tobata | B60R 21/015 |
| | | | 280/807 |
| 2007/0085319 A1 | 4/2007 | Scherzinger et al. | |
| 2013/0049340 A1* | 2/2013 | Tombe | B60R 21/017 |
| | | | 280/807 |
| 2013/0256445 A1 | 10/2013 | Lucht et al. | |

FOREIGN PATENT DOCUMENTS

| | | |
|---|---|---|
| DE | 102004012173 A1 | 10/2005 |
| DE | 102018219040 A1 | 5/2020 |
| EP | 1498326 A1 | 1/2005 |
| WO | 2003099619 A2 | 12/2003 |
| WO | 2008149698 A1 | 12/2008 |
| WO | 2013124027 A1 | 8/2013 |
| WO | 2022248332 A1 | 12/2022 |

* cited by examiner

BELT RETRACTOR HAVING AN ELECTRIC MOTOR

The present invention relates to a belt retractor having the features of the preamble of claim 1.

Belt retractors have as basic components a load-bearing frame and a belt reel that is rotatably mounted in the frame and onto which a safety belt can be wound. The frame serves not only for mounting the belt reel but also for fastening the belt retractor to a seat structure or to a vehicle structure and, for this purpose, is made of a correspondingly thick steel sheet, which is bent into a U-shaped frame.

Furthermore, in modern safety belt devices, belt retractors are provided with electric motors, which drive the belt shaft upon activation to a reversible belt tightening in the winding direction, for example. The electric motor is likewise fastened to the frame and is arranged laterally of the belt shaft with a drive shaft oriented in parallel to the axis of rotation of the belt shaft. Furthermore, it is known to provide a gear mechanism between the belt shaft and the electric motor, by means of which gear mechanism the rotational speed of the electric motor is converted into a predetermined, lower rotational speed of the belt shaft. The use of the gear mechanism thus makes it possible to use an electric motor which is as small as possible, with a high rotational speed, while preserving a simultaneously high torque acting on the belt shaft. A belt retractor with an increased installation space requirement is thus produced overall, despite the use of the compact electric motor made possible by the gearing mechanism. Such a belt retractor is known, for example, from publication WO 03/0 99 619 A2.

If the belt shaft is to be driven at different rotational speeds and torques, further gear stages must be provided, which further increase the installation space requirement. Such a belt retractor is known, for example, from publication DE 199 27 731 C2.

DE 10 2018 219 040 A1 discloses a belt retractor having a belt shaft rotatably mounted in a housing fixed to the vehicle, around which a safety belt can be wound, and an electric motor for driving the belt shaft to produce a rotational movement, and a gear mechanism transmitting the rotational movement from the electric motor to the belt shaft, wherein the gear mechanism can be driven with a second torque by switching a coupling to drive the belt shaft. The gear mechanism in this case comprises a planetary gearing, a gear mechanism housing, and the coupling, wherein the coupling shifts the gear mechanism by blocking a first part of the gear mechanism. In this case, the coupling itself is automatically shifted in a speed-controlled, inertia-force-controlled, or torque-controlled manner according to the rotational drive movement of the electric motor. The planetary gearing comprises, among other things, a planet carrier and a plurality of externally toothed planet gears which are rotatably mounted on the planet carrier, the teeth of which mesh for producing a rotary drive connection with a toothing of a drive gear driven by the electric motor and, for producing a rotary drive connection, mesh with a toothing of a output gear which is in rotary connection with the belt shaft, wherein the planet gears are also in toothed engagement with an internal toothing of a fixed ring gear.

Against this background, the invention is based on the object of providing a belt retractor having an electric motor for driving the belt shaft to a rotational movement, and a shiftable planetary gearing that transmits the rotational movement from the electric motor to the belt shaft, and that has an internally toothed ring gear and planet gears engaging therewith, which is intended to have a reliable shifting of the planetary gearing which can be implemented in a structurally simple manner.

According to the basic idea of the invention, it is proposed that the first ring gear is designed to be rotatable and has a blocking contour, and that a blocking device which is fixed in place relative to the first ring gear is provided with a first blocking lever which blocks the first ring gear to shift the planetary gearing upon actuation by a movement of the first blocking lever into the blocking contour.

According to the solution according to the invention, the first ring gear is designed to be rotatable, so that the first ring gear can rotate when in the non-blocked position, driven by the rotational movement of the planet gears. In this position, the planet carrier does not rotate and the planet gears execute a rotational movement solely about their rotational axes relative to the stationary planet carrier. As a result, the output gear and thus the belt shaft are driven in a first gear ratio via the rotating planet gears. Furthermore, a stationary blocking device that is fixed in relation to the first ring gear is provided with a first blocking lever, and a blocking contour is additionally provided on the first ring gear, so that the first ring gear can be blocked against further rotation by the engagement of the first blocking lever in the blocking contour. In the blocked position, the first ring gear then forms a fixed counter bearing for the planet gears engaging in the internal toothing, and the planet gears are thereby forced into a circumferential rotational movement at a different rotational speed. This circumferential rotational movement of the planet gears is then transmitted to the output gear in order to implement a second gear ratio.

It is further proposed that the first blocking lever is spring-loaded in the engagement direction into the blocking contour via a first spring, and the blocking device has a second blocking lever which blocks the first blocking lever against the spring force exerted by the first spring in the direction of a non-engaged position of the blocking contour. The second blocking lever blocks the first blocking lever in its position that does not block the first ring gear, against the spring force exerted by the first spring. The engagement movement of the first blocking lever can thereby be triggered very easily by moving the second blocking lever out of its position blocking the first blocking lever. Due to its spring bias, the first blocking lever then automatically executes the further blocking movement until the blocking contour is engaged. Due to the proposed solution, the blocking movement of the first blocking lever can be implemented and reliably triggered in a very short time period and with very simple mechanical means.

The second blocking lever can preferably be spring-loaded by a second spring in the direction of the position blocking the first blocking lever. The two blocking levers are thus braced against one another in such a way that the second blocking lever biases the first blocking lever in the direction of the blocking position. Conversely, this means that the first blocking lever is very easily released by pivoting the second blocking lever against the force of the second spring. If the first blocking lever is spring-loaded via the first spring in the direction of the engagement position into the blocking contour by the first spring, the release of the first blocking lever automatically causes the first blocking lever to automatically pivot into the engagement position into the blocking contour and block the first ring gear.

It is further proposed that a control contour is provided on the planet carrier, against which control contour the second blocking lever rests, wherein the control contour has a shape which forces the second blocking lever into a pivoting movement releasing the first blocking lever upon a rotational movement of the planet carrier. The electric motor drives the output gear and thus the belt shaft in the winding direction in the first gear ratio when the first ring gear is not blocked. When the counterforce exerted by the safety belt increases, an increasing reaction torque automatically acts on the planet carrier, which results in the planet carrier performing a slight rotational movement. This rotational movement of the planet carrier is utilized by the control contour provided thereon to force the second blocking lever against the spring force exerted by the second spring into the movement releasing the first blocking lever, and the first blocking lever is automatically moved by the spring force exerted by the first spring into the engagement movement into the blocking contour of the first ring gear. The blocking device and the planetary gearing thus essentially shift themselves when the planet carrier executes the slight rotational movement. After the shifting of the planetary gearing, the output gear and thus the belt shaft are driven at a lower rotational speed, but with a higher torque, in the second gear ratio.

In this case, the planet carrier preferably has on its outside an annular surface with a constant diameter and a circular cross-section, and the control contour is formed by at least one groove provided therein. Due to the proposed shaping of the outer contour and the control contour, the planet carrier can subsequently rotate freely relative to the second blocking lever without being unintentionally blocked by it. In this case, the control contour in the form of the groove in conjunction with the proposed outer shape is particularly advantageous, since the second blocking lever slides on the outer contour and only travels over the groove without dipping into it. For this purpose, the spring force and the mass of the second blocking lever are deliberately designed in such a way that the time period during which the second blocking lever travels over the groove is not sufficient for the blocking lever to enter the groove and block the planet carrier again.

This can preferably be achieved by the circumferential portion of the annular surface in which the groove creates a recess being less than 10 degrees of the circumference.

It is further proposed that the output gear is formed by a second ring gear with an internal toothing, and the planet gears are in engagement with the internal toothing of the second ring gear in a toothed engagement. The advantage of the proposed solution can be seen in that the output gear in the form of the second ring gear, by means of an arrangement next to the first ring gear, enables a particularly simple meshing of the planet gears both into the first ring gear and into the output gear, by the planet gears being axially extended and thereby engaging both in the internal toothing of the first ring gear and in the internal toothing of the output gear designed as a second ring gear.

The planet gears can preferably have a first and a second toothed portion, wherein they are in engagement with the internal toothing of the first ring gear via the first toothed portion, and are in engagement with the internal toothing of the second ring gear via the second toothed portion, and the second toothed portion has a greater toothing diameter than the first toothed portion. The planet gears can accordingly be utilized, in a compact and at the same time simple design of the gear mechanism, to produce an additional gear ratio conversion of the rotational movement.

It is further proposed that the drive gear is formed by a two-stage gear wheel with a drive toothing and an output toothing, wherein the drive gear is in toothed engagement with the planet gears via the output toothing, and is in a toothed engagement with a drive gear wheel driven by the electric motor via the drive toothing. The drive gear thus forms the rotary drive connection from the drive gear wheel, which is driven by the electric motor, to the planet gears of the planetary gearing.

The drive toothing of the drive gear preferably has a greater toothing diameter than the output toothing. In order to realize a compact design, the drive gear can accordingly be driven radially from the outside via the drive toothing, while it engages with the toothings of the planet gears via the output toothing with the smaller toothing diameter on the radial inner side.

Furthermore, the output gear can preferably be formed by a two-stage gear wheel with a drive toothing and an output toothing, wherein the output gear is in toothed engagement with a gear wheel of a gearing driving the belt shaft via the output toothing, and is in toothed engagement with the planet gears via the drive toothing. The output gear thus forms the rotary drive connection from the planet gears to the first gear wheel of the gearing that further transmits the rotational movement to the belt shaft.

In this case, the drive toothing can preferably have a larger toothing diameter than the output toothing, so that the output gear, in order to create a compact and simple structure of the belt retractor, is in engagement with the toothings of the planet gears via the drive toothing on the larger toothing diameter, and is in toothed engagement with the gear wheel of the gear wheel that further transmits the rotational movement, via the smaller toothing diameter. If the output gear is designed as a second ring gear, the internal toothing would be the drive toothing with the greater toothing diameter, and the planet gears would engage in the internal toothing from the radial inner side in order to realize a compact design and to realize a gear ratio conversion.

The invention is explained below using preferred embodiments with reference to the accompanying figures. In the figures.

Figure 1:
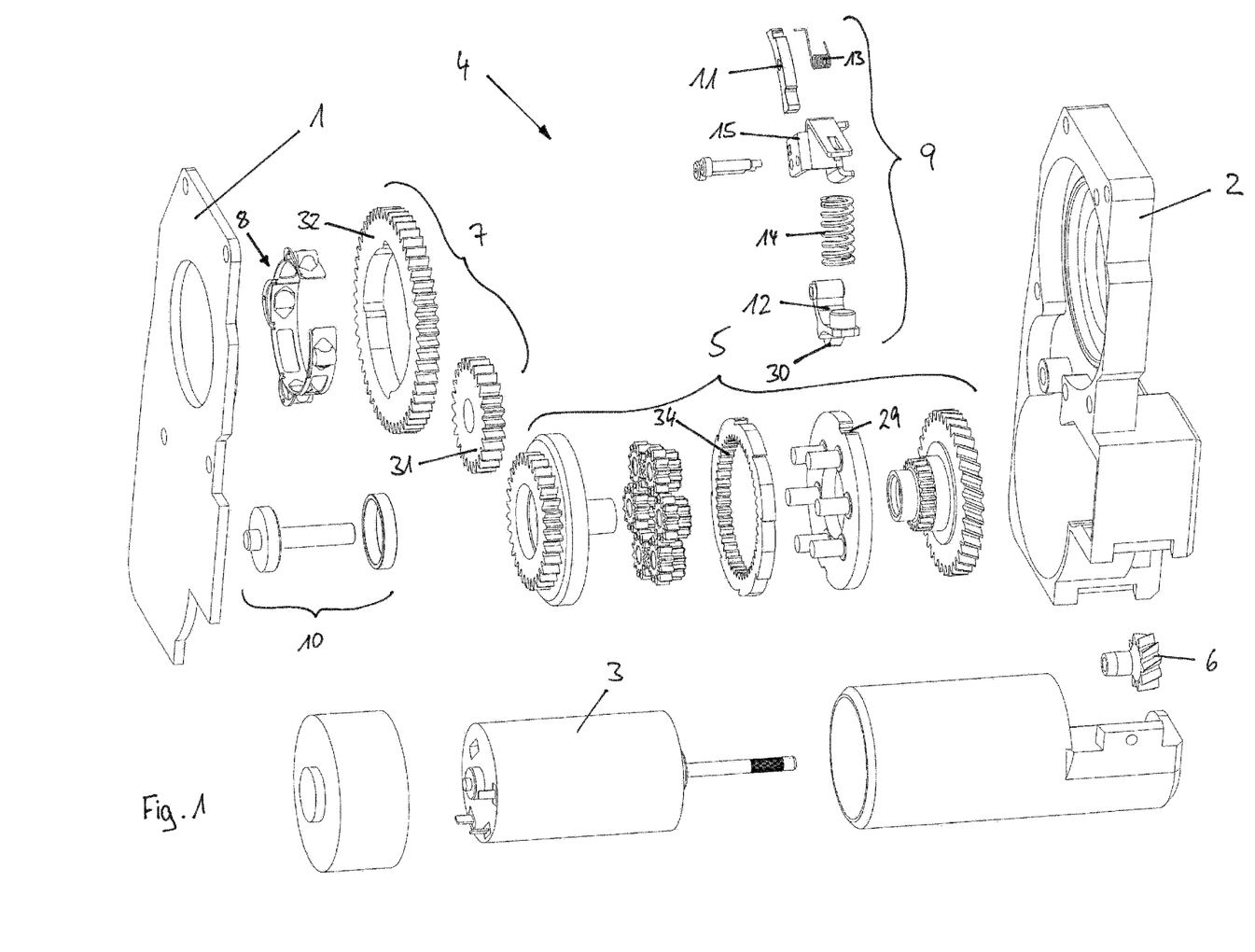
FIG. 1 shows an exploded view of a gear mechanism housing with an electric motor and a gear mechanism with a shiftable planetary gearing of a belt retractor according to the invention.

FIG. 1 is a part of a frame 1 of a belt retractor, a gear mechanism housing 2, a gear mechanism 4 arranged therein, and an electric motor 3 arranged therein. The frame 1 serves to hold the belt retractor fixed to the vehicle, and to receive and transfer the forces into the vehicle structure when it retains a passenger. The belt retractor has a belt shaft (not shown) which is rotatably mounted in the frame 1 and serves for winding a safety belt. The belt shaft is spring-loaded via a winding spring supported on the frame 1 in the winding direction of the safety belt that can be wound thereon, and can additionally be drivable via an irreversible tensioning device. Furthermore, the belt shaft is provided with blocking devices and corresponding sensor devices; and additional force-limiting devices can be provided which, when blocking devices are activated, enable a force-limited belt strap extension. The belt shaft itself is not shown, but can easily be imagined in the configuration—without the need to solve further design problems to do so. The gear mechanism housing 2 serves to hold the gear mechanism 4 and the electric motor 3 on the frame 1, and is also fixed to the vehicle in the fastened position of the belt retractor. The electric motor 3 is likewise held fixedly in the gear mechanism housing 2, and is supported via the same upon an activation. A drive shaft is led out on one side of the electric motor 3, at the end of which drive shaft a drive gear wheel 6 is fastened in a rotationally fixed manner.

The gear mechanism 4 comprises a shiftable planetary gearing 5, a blocking device 9, and a gearing 7 which transmits the rotational movement further to the belt shaft and which is mounted or held in the gear mechanism housing 2 and is also held thereby relative to the frame 1 of the belt retractor. The shiftable planetary gearing 5 is designed in this case as a Wolfrom gear mechanism or also an epicyclic gear mechanism.

The blocking device 9 comprises two blocking levers 11 and 12, two springs 13 and 14, and a frame 15 for mounting the blocking device 9 fixed to the vehicle in the gear mechanism housing 2.

Figure 2:
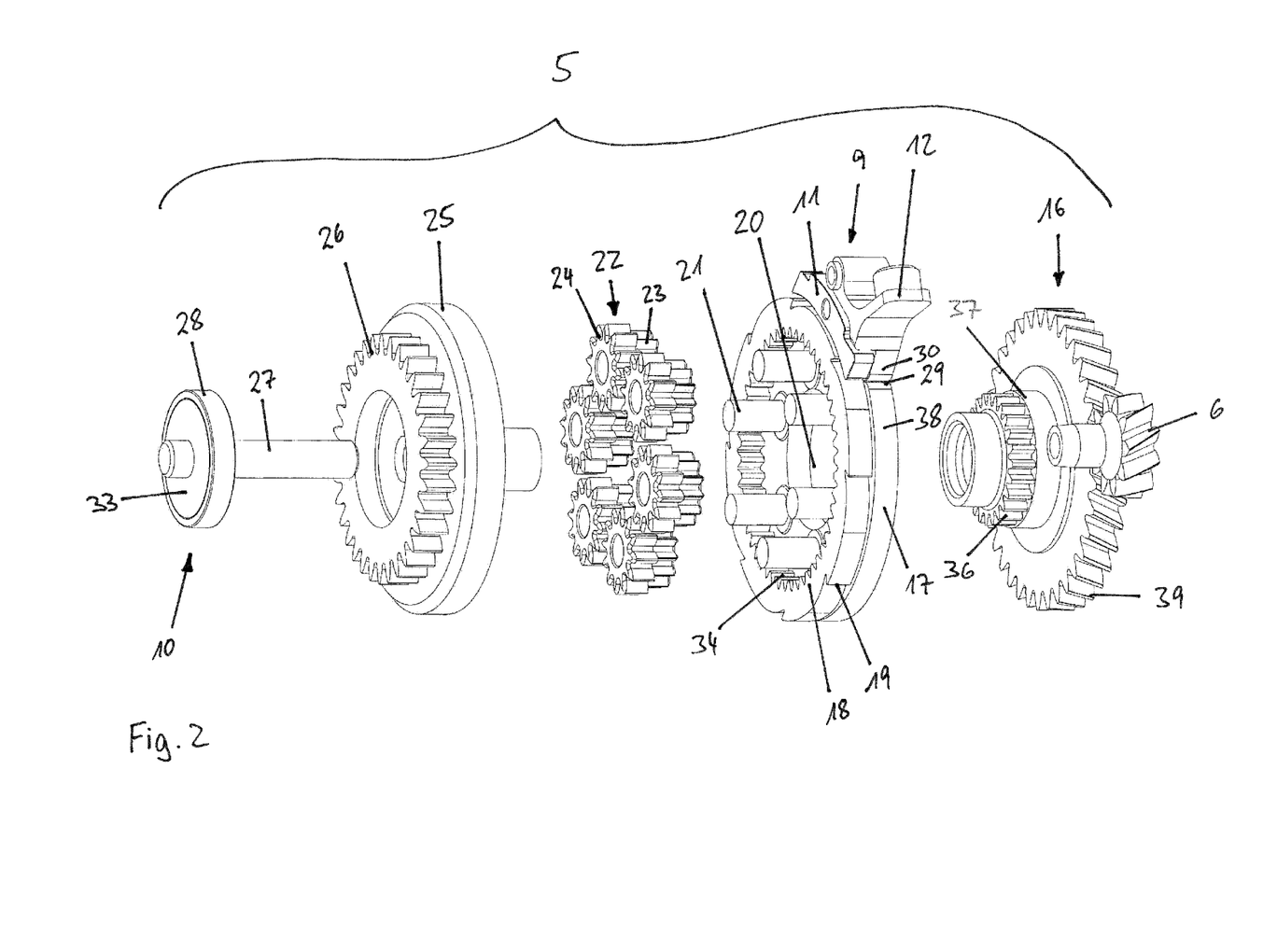
FIG. 2 shows the shiftable planetary gearing in an exploded view.

The planetary gearing 5 shown enlarged in FIG. 2 comprises a drive gear 16, a planet carrier 17 with axially projecting bearing journals 21 and planet gears 22 rotatably mounted thereon, an output gear 25, and a bearing unit 10. The drive gear 16 has a radial external toothing 39 and a radial output toothing 36 arranged on an axial extension 37, wherein the drive toothing 39 has a greater toothing diameter than the output toothing 36. The drive gear 16 together with the drive toothing 39 is in toothed engagement with the drive gear wheel 6 of the electric motor 3, and is driven via it when the electric motor 3 is activated.

The planet carrier 17 is annular and has an opening 20 through which the drive gear 16 projects with the extension 37, so that it is arranged with the output toothing 36 in one plane with first toothed portions 23 of the planet gears 22, and engages in the toothings of the first toothed portions 23 of the planet gears 22. Furthermore, a first ring gear 18 with an internal toothing 34 is provided, into which the planet gears 22 engage radially on the outside with their first toothed portions 23. The planet gears 22 are each axially extended and each have a second toothed portion 24 arranged next to the first toothed portion 23. The second toothed portions 24 have a greater toothing diameter than the first toothed portions 23 and, together with the first toothed portions 23, each form one-piece planet gears 22 with a stepped external toothing. Furthermore, an output gear 25 having a schematically-illustrated internal toothing 35 (only shown in FIG. 5) is provided, into which the planet gears 22 engage with their second toothed portions 24. The drive gear 25 can thus also be regarded as a second ring gear of the planetary gearing 5. Since the second toothed portions 24 of the planet gears 22 have a larger toothing diameter than the first toothed portions 23, but are simultaneously formed as a single piece, coaxially with the first toothed portions 23, the internal toothing 35 of the output gear 25 also has a larger toothing diameter than the internal toothing 34 of the first ring gear 18. The output gear 25 further has a radially outwardly directed output toothing 26, via which it is in toothed engagement with a first gear wheel 31 of the gearing 7, which in turn is in toothed engagement with a second gear wheel 32. Furthermore, a freewheel clutch 8 is provided between the second gear wheel 32 of the gearing 7 and the belt shaft (not shown), which, in the coupled position, produces a rotary connection from the second gear wheel 32 to the belt shaft in the winding direction of the safety belt wound up on the belt shaft, and in the non-coupled position allows a free rotation of the belt shaft relative to the second gear wheel 32 both in the winding and unwinding direction of the safety belt.

The planet carrier 17 has a circular annular surface 38 on the radial outside, with a control contour 29 in the form of a groove, wherein the groove extends over a very short circumferential portion of less than 10 degrees. The control contour 29 in the form of the groove thus forms only a very short, radially inwardly directed recess in the annular surface 38, which is otherwise annular with a diameter that is constant over the circumference. On its radial outside, the first ring gear 18 has a blocking contour 19 in the form of ramps with curved outer surfaces, each oriented in the same direction. The blocking contour 19 can thus also be regarded as a toothing oriented in one direction.

The blocking device 9 is held in the gear mechanism housing 2 via the frame 15 such that it is arranged with the two blocking levers 11 and 12 radially on the outside on the first ring gear 18 and the planet carrier 17. Furthermore, the two blocking levers 11 and 12 are mounted to be rotatable on the frame 15, and the first blocking lever 11 is additionally spring-loaded in the direction of a blocking position by means of a first spring 13 in which it engages with a tip into the blocking contour 19 of the first ring gear 18 and blocks the first ring gear 18 against further rotation. In this case, the second blocking lever 12 is supported on the gear mechanism housing 2 via the second spring 14 such that it is pushed into the control contour 29 with a cam 30—that is, into the groove of the planet carrier 17, and thus blocks a rotation of the planet carrier 17 in the circumferential direction. Furthermore, the second blocking lever 12 is simultaneously pushed by the second spring 14 into a position in which it blocks the first blocking lever 11 against the spring force exerted by the first spring 13, into a position in which it does not engage in the blocking contour 19 of the first ring gear 18, so that the first ring gear 18 can rotate freely relative to the gear mechanism housing 2, as can also be seen in FIG. 3.

The bearing unit 10 comprises a bearing shaft 27 which passes through the output gear 25, the first ring gear 18, the planet carrier 17 and the drive gear 16. Furthermore, the bearing shaft 27 has, on the end for the output gear 25, a bearing disk 33 with a bearing ring 28 arranged thereon to increase the bearing diameter where the output gear 25 is mounted.

Figure 3:
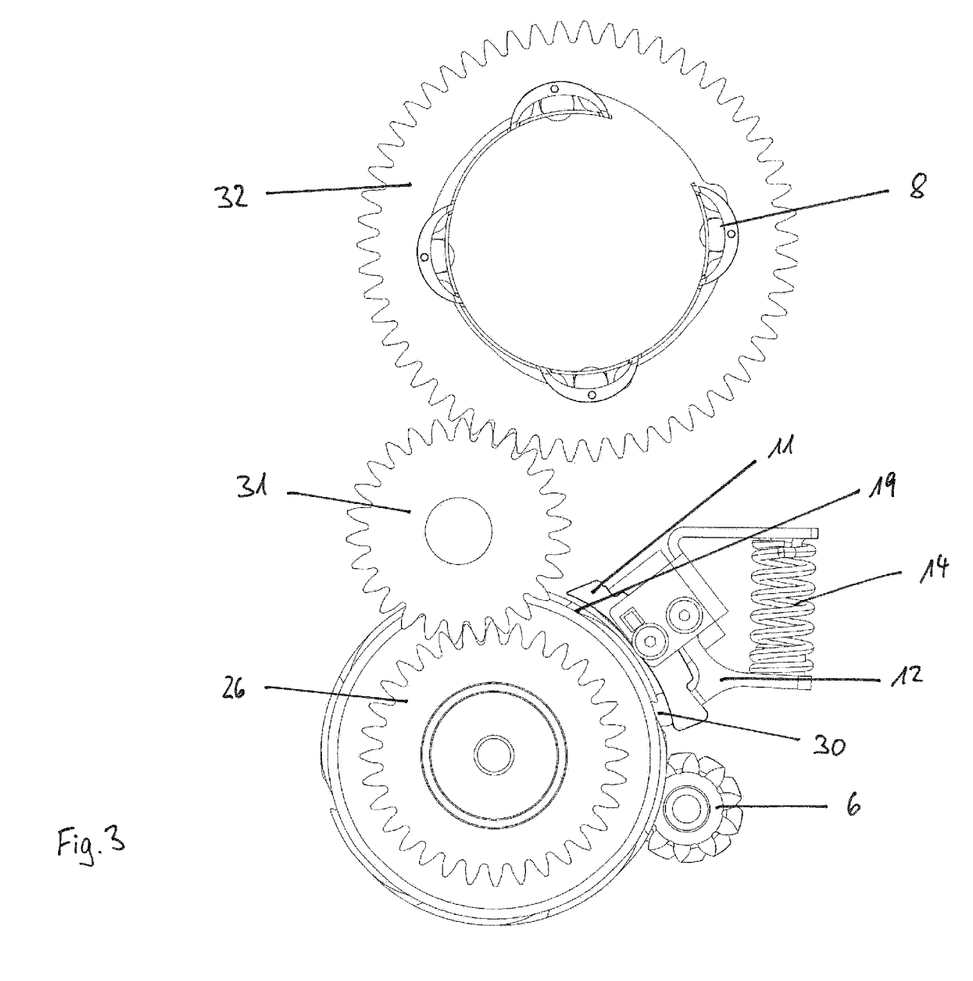
FIG. 3 shows the gear mechanism with a blocking device in a first shifting position.
Figure 4:
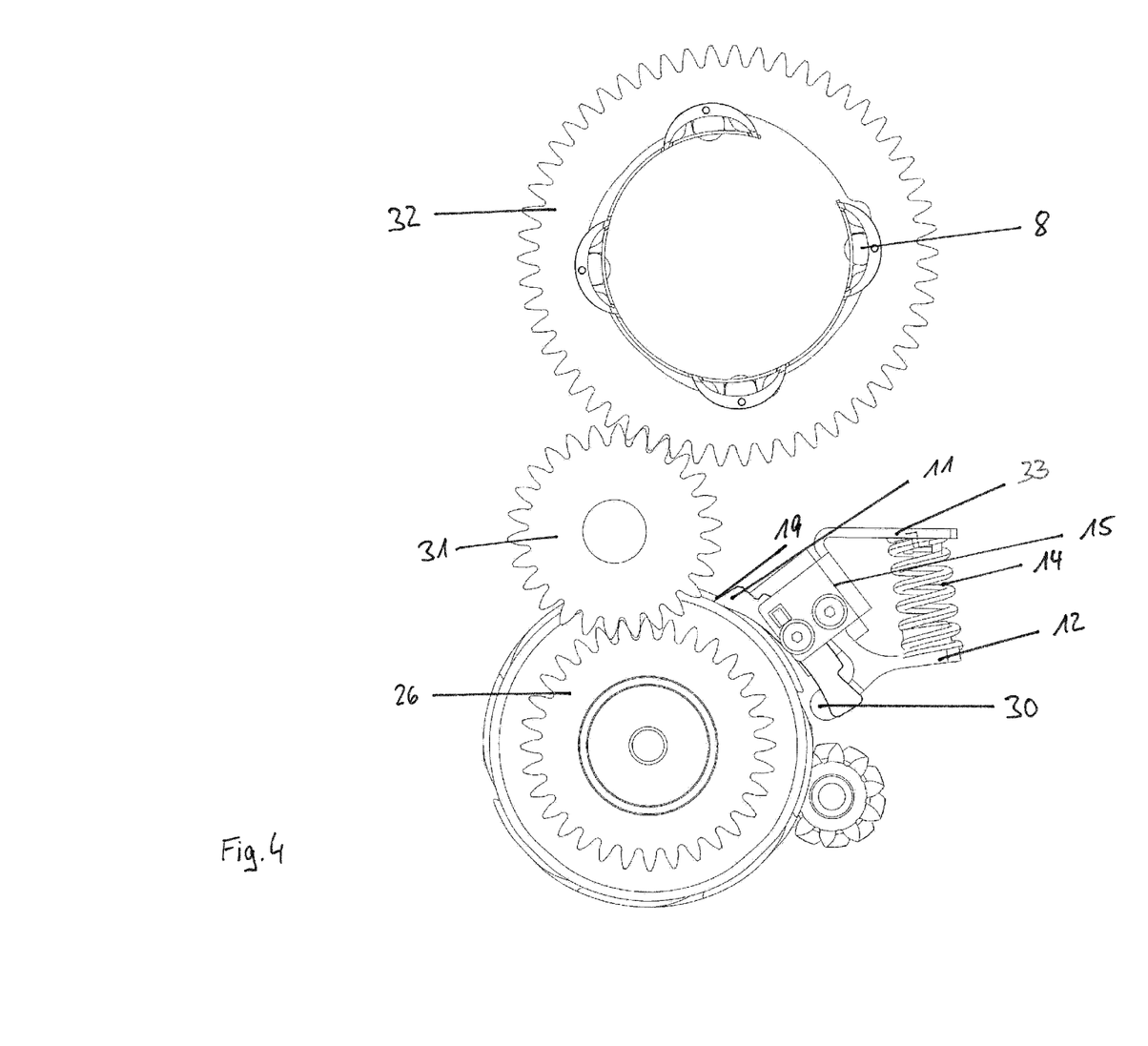
FIG. 4 shows the gear mechanism with the blocking device in a second shifting position.

In this way, the rotary drive movement of the electric motor 3 is transmitted, when the planet carrier 17 is blocked by the second blocking lever 12, according to the following movement sequence, wherein the directions of rotation in relation to the perspective shown in FIGS. 3 and 4 are described with a belt shaft which must be imagined in front of the second gear wheel 32. The perspective corresponds to the direction of view toward the gear mechanism 4 and/or the planetary gearing 5 in FIGS. 1 and 2, from the left-hand side. The electric motor 3 drives the drive gear 16 counterclockwise in the perspective of FIG. 3 via the drive gear wheel 6 engaging in the drive toothing 39. The planet carrier 17 is blocked via the second blocking lever 12 engaging in the control contour 29, so that the planet gears 22 are driven, by the engagement of the output toothing 36 of the drive gear 16 in the toothings of the first toothed portions 23 of the planet gears, to a rotational movement about their own rotational axes defined by the journals 21, without also revolving around the axis of rotation of the drive gear 16. At the same time, the first ring gear 18 is driven by the engagement of the first toothed portions 23 into the internal toothing 34, with a reversal of the direction of rotation, to a clockwise rotational movement. The rotational movement of the first ring gear 18 is thereby deliberately enabled by the fact that it is not blocked by the first blocking lever 11. The rotational movement of the planet gears 22 is further transmitted by the toothed engagement of the second toothed portions 24 into the internal toothing 35 of the output gear 25, wherein the output gear 25 also rotates in the clockwise direction. The rotational movement of the output gear 25 is then further transmitted via the two gear wheels 31 and 32 of the gearing 7 and the freewheel clutch 8 to the belt shaft in a first gear ratio I1 in the winding direction of the safety belt, wherein the freewheel clutch 8 automatically produces the rotary connection upon the start of the rotational movement of the second gear wheel 32. In this case, the safety belt is rolled up, for example, into a stowed position, and/or in a first reversible tensioning process to take up excess safety belt slack, by driving the belt shaft in the winding direction. A comparatively low retraction force of, for example, up to 100 N is thereby exerted on the safety belt.

If the counterforce exerted by the safety belt increases, for example because the safety belt is already deployed close to the passenger, and the electric motor 3 continues to exert a drive torque on the belt shaft via the gear mechanism 4, this leads to an increase in the reaction torque acting on the planet gears 22. In the event that this reaction torque exceeds the holding torque exerted by the second blocking lever 12 engaging in the control contour 29, the planet carrier 17 begins to execute a rotational movement in the clockwise direction by means of a drive via the planet gears 22. As a result, the second blocking lever 12 slides off the control contour 29 and is forced into a pivoting movement against the spring force exerted by the second spring 14. As a result of this pivoting movement of the second blocking lever 12, it passes into the position shown in FIG. 4, in which it no longer engages with the cam 30 into the control contour 29, and at the same time no longer blocks the first blocking lever 11. Since the first blocking lever 11 is spring-loaded in the direction of its blocking position via the first spring 13, it automatically moves into a position in which it engages with its tip in the blocking contour 19 of the first ring gear 18 and blocks it against a further rotational movement in the clockwise direction. The first ring gear 18 then forms a fixed counter bearing for the planet gears 22. The rotary drive movement of the electric motor 3 can then only be transmitted by the planet carrier 17 rotating counterclockwise with the planet gears 22, while the planet gears 22 rotate clockwise about their rotational axes defined by the journals 21. This rotational movement of the planet gears 22 is then transmitted to the belt shaft again via the output gear 25, the gearing 7, and the freewheel clutch 8 to implement a second gear ratio I2 in the same force transmission path. The belt shaft is thereby driven at a lower rotational speed, but with a higher torque, in the winding direction.

The advantage of the solution described is that the planetary gearing 5 is practically automatically switched by the blocking device 9 when the retraction force to be exerted is increased in the safety belt. The tensile force in the safety belt at which the planetary gearing 5 is shifted, is defined by the design of the torque to be exerted on the planet carrier 17, which torque is required in order to release the blocking of the second blocking lever 12. For this purpose, in particular the spring force exerted by the second spring 14, the shape of the control contour 29, and the shape of the cam 30, that is, the shape of the positive connection between the second blocking lever 12 and the planet carrier 17, i.e., for example, the depth of the groove and the height of the cam 30 engaging therein, are available.

On its radial outside, the planet carrier 17 has a circular annular surface with a diameter which is constant over the circumference and which is interrupted by the control contour 29 in the form of the groove only over a very short circumferential portion of preferably less than 10 degrees. The planet carrier 17 can thus execute the rotational movement under the pivoted second blocking lever 12 without being impeded in its rotational movement. In particular, the control contour 29, that is, the groove, is thus formed only over a very small portion of the circumference of preferably less than 10 degrees, so that the second blocking lever 12 travels over the groove despite the spring force exerted by the second spring 14, and does not lock back into it.

The different gear ratios of the planetary gearing 5 are thus produced by either the planet carrier 17 being blocked and the first ring gear 18 rotating freely, or by the first ring gear 18 being blocked and the planet carrier 17 being released.

Figure 5:
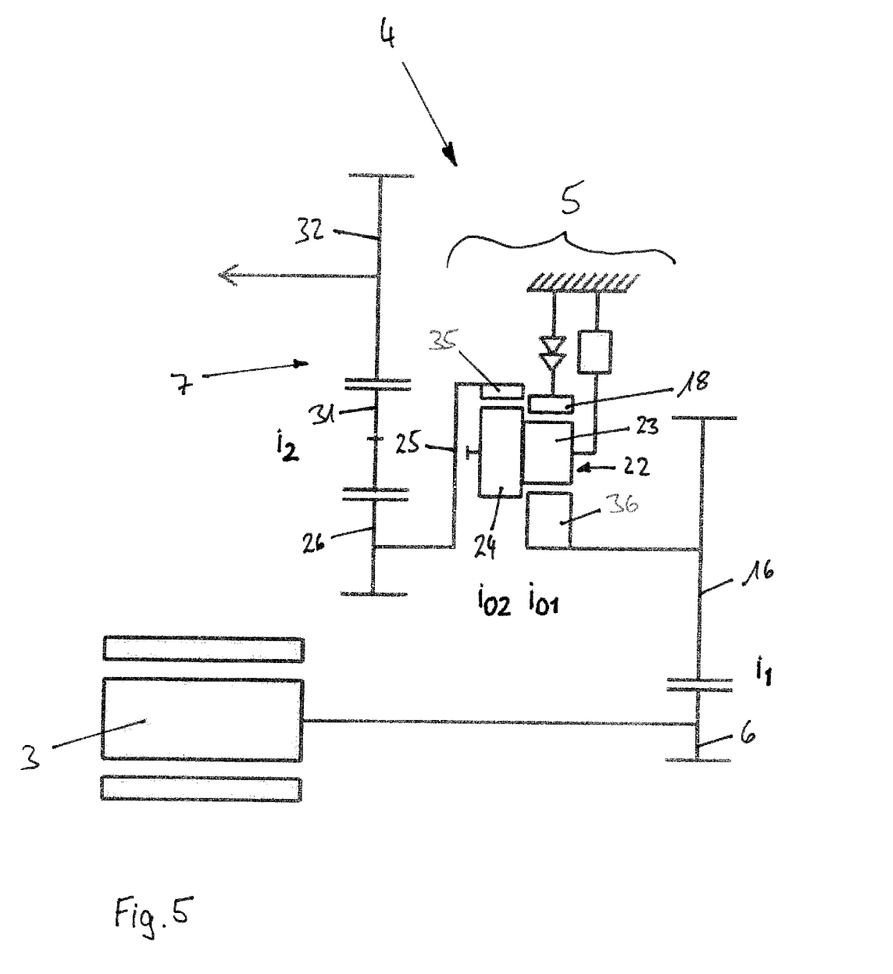
FIG. 5 shows the electric motor with the gear mechanism in a schematic representation.

FIG. 5 schematically shows the gear mechanism 4 with the electric motor 3 again. The gear ratio in the gear mechanism 4 can be divided into a gear ratio i1 between the drive gear wheel 6 and the drive gear 16, and a gear ratio i2 from the output gear 25 via the gearing 7 to the belt shaft, which are each unchangeable.

The change in the gear ratio takes place here only by shifting the planetary gearing 5 according to the principle described above, wherein different gear ratios i01 or i02 can be implemented depending on whether the planet carrier 17 with the planet gears 22 is blocked to halt a revolving movement, or the first ring gear 18 is blocked to halt a rotational movement. In the overall gear ratio I1=i1×i2×i01 or I2=i1×i2×i02, a conversion of I1=10 and I2=120 can be implemented according to the shift state of the planetary gearing 5.

In particular, the design of the output gear 25 as the second ring gear with an internal toothing 35 is advantageous, since a very compact design of the planetary gearing 5 is thereby enabled by an arrangement next to the first ring gear 18, and an axial extension of the planet gears 22 with the two toothed portions 23 and 24. Here, the internal toothing 35 forms the drive toothing for the output gear 25, which deliberately has a greater toothing diameter than the output toothing 26, so that here a rotational movement is converted into a slower rotational speed only by the stepped output gear 25. The same applies to the drive gear 16 in which the drive toothing 39 likewise has a greater toothing diameter than the output toothing 36.

The invention claimed is:

1. A belt retractor, having
a belt shaft which is rotatably mounted in a frame and around which a safety belt can be wound, the frame being able to be fastened to the vehicle, and
an electric motor for driving a rotational movement of the belt shaft, and
a shiftable planetary gearing transmitting the rotational movement from the electric motor to the belt shaft, having
a planet carrier and a plurality of externally toothed planet gears which are rotatably mounted on the planet carrier and engage via their toothings in a toothing of a drive gear driven by the electric motor to produce a rotary drive connection, and engage in a toothing of an output gear which has a rotary drive connection with the belt shaft to produce a rotary drive connection, wherein
the planet gears are in toothed engagement with an internal toothing of a first ring gear,
wherein the first ring gear is designed to be rotatable, has a blocking contour, and is spring-loaded in the engagement direction into the blocking contour via a first spring, and a blocking device which is fixed in place relative to the first ring gear is provided with a first blocking lever which blocks the first ring gear to shift the planetary gearing upon actuation by means of a movement of the first blocking lever into the blocking contour, the blocking device having a second blocking lever which blocks the first blocking lever against the spring force exerted by the first spring, in the direction of a non-engaged position of the blocking contour.

2. The belt retractor according to claim 1, wherein the second blocking lever is spring-loaded by a second spring in the direction of the position blocking the first blocking lever.

3. The belt retractor according to claim 1, wherein a control contour is provided on the planet carrier, against which control contour the second blocking lever rests, wherein the control contour has a shape which forces the second blocking lever into a pivoting movement releasing the first blocking lever upon a rotational movement of the planet carrier.

4. The belt retractor according to claim 3, wherein the planet carrier has on its outside an annular surface with a constant diameter and a circular cross-section, and the control contour is formed by at least one groove made therein.

5. The belt retractor according to claim 4, wherein the circumferential portion of the annular surface in which the groove creates a recess is less than 10 degrees of the circumference.

6. The belt retractor according to claim 1, wherein the output gear is formed by a second ring gear with an internal toothing, and the planet gears are in toothed engagement with the internal toothing of the second ring gear.

7. The belt retractor according to claim 6, wherein the planet gears have a first and a second toothed portion, wherein they are in engagement via the first toothed portion with the internal toothing of the first ring gear, and via the second toothed portion with the internal toothing of the second ring gear, and the second toothed portion has a greater toothing diameter than the first toothed portion.

8. The belt retractor according to claim 1, wherein the drive gear is formed by a two-stage gear wheel with a drive toothing and an output toothing, wherein the drive gear is in toothed engagement with the planet gears via the output toothing, and is in toothed engagement with a drive gear wheel driven by the electric motor via the drive toothing.

9. The belt retractor according to claim 8, wherein the drive toothing has a greater toothing diameter than the output toothing.

10. The belt retractor according to claim 1, wherein the output gear is formed by a two-stage gear wheel with a drive toothing and an output toothing, wherein the output gear is in toothed engagement with a gear wheel of a gearing driving the belt shaft via the output toothing, and is in toothed engagement with the planet gears via the drive toothing.

11. The belt retractor according to claim 10, wherein the drive toothing has a greater toothing diameter than the output toothing.

12. A belt retractor, having
a belt shaft which is rotatably mounted in a frame and around which a safety belt can be wound, the frame being able to be fastened to the vehicle, and an electric motor for driving a rotational movement of the belt shaft, and a shiftable planetary gearing transmitting the rotational movement from the electric motor to the belt shaft, having a planet carrier and a plurality of externally toothed planet gears which are rotatably mounted on the planet carrier and engage via their toothings in a toothing of a drive gear driven by the electric motor to produce a rotary drive connection, and engage in a toothing of an output gear which has a rotary drive connection with the belt shaft to produce a rotary drive connection, wherein the planet gears are in toothed engagement with an internal toothing of a first ring gear, wherein the first ring gear is designed to be rotatable and has a blocking contour, and a blocking device which is fixed in place relative to the first ring gear is provided with a first blocking lever which blocks the first ring gear to shift the planetary gearing upon actuation by means of a movement of the first blocking lever into the blocking contour, wherein the output gear is formed by a second ring gear with an internal toothing, and the planet gears are in toothed engagement with the internal toothing of the second ring gear.

13. The belt retractor according to claim 12, wherein the first blocking lever is spring-loaded in the engagement direction into the blocking contour via a first spring, and the blocking device has a second blocking lever which blocks the first blocking lever against the spring force exerted by the first spring, in the direction of a non-engaged position of the blocking contour.

14. A belt retractor according to claim 12, wherein the planet gears have a first and a second toothed portion, wherein they are in engagement via the first toothed portion with the internal toothing of the first ring gear, and via the second toothed portion with the internal toothing of the second ring gear, and the second toothed portion has a greater toothing diameter than the first toothed portion.

15. A belt retractor according to claim 12, wherein the drive gear is formed by a two-stage gear wheel with a drive toothing and an output toothing, wherein the drive gear is in toothed engagement with the planet gears via the output toothing, and is in toothed engagement with a drive gear wheel driven by the electric motor via the drive toothing.

16. A belt retractor, having
a belt shaft which is rotatably mounted in a frame and around which a safety belt can be wound, the frame being able to be fastened to the vehicle, and an electric motor for driving a rotational movement of the belt shaft, and a shiftable planetary gearing transmitting the rotational movement from the electric motor to the belt shaft, having a planet carrier and a plurality of externally toothed planet gears which are rotatably mounted on the planet carrier and engage via their toothings in a toothing of a drive gear driven by the electric motor to produce a rotary drive connection, and engage in a toothing of an output gear which has a rotary drive connection with the belt shaft to produce a rotary drive connection, wherein the planet gears are in toothed engagement with an internal toothing of a first ring gear, wherein the first ring gear is designed to be rotatable and has a blocking contour, and a blocking device which is fixed in place relative to the first ring gear is provided with a first blocking lever which blocks the first ring gear to shift the planetary gearing upon actuation by means of a movement of the first blocking lever into the blocking contour, wherein the drive gear is formed by a two-stage gear wheel with a drive toothing and an output toothing, wherein the drive gear is in toothed engagement with the planet gears via the output toothing, and is in toothed engagement with a drive gear wheel driven by the electric motor via the drive toothing.

17. A belt retractor according to claim 16, wherein the drive toothing has a greater toothing diameter than the output toothing.

18. A belt retractor according to claim 16, wherein the first blocking lever is spring-loaded in the engagement direction into the blocking contour via a first spring, and the blocking device has a second blocking lever which blocks the first blocking lever against the spring force exerted by the first spring, in the direction of a non-engaged position of the blocking contour.

19. A belt retractor, having a belt shaft which is rotatably mounted in a frame and around which a safety belt can be wound, the frame being able to be fastened to the vehicle, and an electric motor for driving a rotational movement of the belt shaft, and a shiftable planetary gearing transmitting the rotational movement from the electric motor to the belt shaft, having a planet carrier and a plurality of externally toothed planet gears which are rotatably mounted on the planet carrier and engage via their toothings in a toothing of a drive gear driven by the electric motor to produce a rotary drive connection, and engage in a toothing of an output gear which has a rotary drive connection with the belt shaft to produce a rotary drive connection, wherein the planet gears are in toothed engagement with an internal toothing of a first ring gear, wherein the first ring gear is designed to be rotatable and has a blocking contour, and a blocking device which is fixed in place relative to the first ring gear is provided with a first blocking lever which blocks the first ring gear to shift the planetary gearing upon actuation by means of a movement of the first blocking lever into the blocking contour, wherein the output gear is formed by a two-stage gear wheel with a drive toothing and an output toothing, wherein the output gear is in toothed engagement with a gear wheel of a gearing driving the belt shaft via the output toothing, and is in toothed engagement with the planet gears via the drive toothing.

20. A belt retractor according to claim 19, wherein the drive toothing has a greater toothing diameter than the output toothing.

* * * * *